United States Patent [19]

Spada et al.

[11] Patent Number: 5,653,087
[45] Date of Patent: Aug. 5, 1997

[54] MANUFACTURING MACHINE DESIGNED TO USE REELS OF WEB MATERIAL, IN PARTICULAR PACKAGING MACHINE FOR PACKAGING CIGARETTES, OR THE LIKE

[75] Inventors: Walter Spada, Marzabotto; Gianfranco Isani, Caluso, both of Italy

[73] Assignee: SASIB S.p.A., Bologna, Italy

[21] Appl. No.: 524,642

[22] Filed: Sep. 8, 1995

[30] Foreign Application Priority Data

Sep. 16, 1994 [IT] Italy ................... GE94A0105

[51] Int. Cl.⁶ .................................................. B65B 41/12
[52] U.S. Cl. ..................... 53/168; 53/203; 53/389.2; 242/559.2; 242/559.3; 242/560
[58] Field of Search ............................. 53/168, 389.2, 53/389.1, 203, 202, 64, 55; 242/559, 558, 559.3, 559.4, 560, 555.2

[56] References Cited

U.S. PATENT DOCUMENTS

| | | | |
|---|---|---|---|
| 4,185,442 | 1/1980 | Johnson et al. | 53/389.2 X |
| 4,400,928 | 8/1983 | Watanabe | 53/168 X |
| 4,478,540 | 10/1984 | Sachot | 409/211 |
| 4,541,221 | 9/1985 | Seragnoli | 53/55 X |
| 4,614,075 | 9/1986 | Focke et al. | 53/168 |
| 4,821,972 | 4/1989 | Grollimund et al. | 242/58.4 |
| 4,863,112 | 9/1989 | Summerauer et al. | 242/78.8 |
| 5,249,757 | 10/1993 | Draghetti et al. | 242/58.6 |
| 5,274,984 | 1/1994 | Fukuda | 53/389.2 X |

FOREIGN PATENT DOCUMENTS

| | | |
|---|---|---|
| 0 577 999 | 1/1994 | European Pat. Off. . |
| 2 548 948 | 1/1985 | France . |
| 41 16 535 | 12/1991 | Germany . |
| 90 17 476.3 | 6/1992 | Germany . |
| 40 41 865 | 7/1992 | Germany . |
| 2 244 983 | 12/1991 | United Kingdom . |

OTHER PUBLICATIONS

VDI–Zeitschrift, no. special, Oct. 1992, Dusseldorf Germany, p. 44, "Endlosstanzen mit automatischem Coilwechsel", (no translation).

Primary Examiner—James F. Coan
Attorney, Agent, or Firm—Larson and Taylor

[57] ABSTRACT

A manufacturing machine designed to use reels of web material, in particular a packaging machine for packaging cigarettes, or the like, in which the processing units are located at least in part on one side of the machine, termed the front side. On the opposite side from the front side, i.e. from that provided at least in part with the processing units which use the web material, is a device for supplying new web reels to and removing the empty cores of the reels from a device for transferring the reels and cores. The transfer means are supported in such a way that they can be moved automatically from the rear side to the front side and vice versa, through at least one corresponding passage approximately perpendicular to the sides of the manufacturing machine.

18 Claims, 6 Drawing Sheets

MANUFACTURING MACHINE DESIGNED TO USE REELS OF WEB MATERIAL, IN PARTICULAR PACKAGING MACHINE FOR PACKAGING CIGARETTES, OR THE LIKE

BACKGROUND OF THE INVENTION

The subject of the invention is a manufacturing machine designed to use reels of web material, in particular a packaging machine for packaging cigarettes or the like, in which the processing units are located at least in part on one side of the machine, termed the front side.

Manufacturing machines of this kind, especially machines for packaging or wrapping cigarettes, use sheets of paper for making the cigarettes and wrapping the filter tips, and sheets of foil, wrapping paper and cellophane or the like, that are cut from a continuous web unwound from a reel. Apart from these sheets, other items such as state monopoly labels for affixing to the packets of cigarettes or the so-called collars for use in hard packets and the like, are also cut from continuous reel-wound webs.

In general, reels of this kind are very heavy and of large dimensions, so that manually to fit them on the unwinding chucks is difficult and hard work for the operatives.

SUMMARY OF THE INVENTION

The object of the invention is to provide a manufacturing machine of the type described at the outset, in which it is possible, by relatively simple and inexpensive means, to automate as far as possible the supplying of the web reels to the machine.

The invention achieves these objects with a manufacturing machine of the type described at the outset, in which on the opposite side from the front side, i.e. from that provided at least in part with the processing units which use the web material, are means for supplying new web reels to and removing the empty cores of the reels from means for transferring the reels and cores, which means are supported in such a way that they can be moved automatically from said rear side to said front side and vice versa, through a passage perpendicular to said sides of the manufacturing machine.

Advantageously, the transfer means directly carry the reel unwinding chuck or chucks which form the reel gripping means and are therefore moved together with the transfer means from the rear side to the front side of the machine, and vice versa.

This makes it possible to avoid a further moving of the reels from the transfer means to the unwinding chucks and makes the operations of supplying the web reels much speedier and faster, and the device itself a good deal more economical and reliable.

The reel unwinding chuck or chucks are mounted on the transfer means in such a way that they can be orientated alternately in a position of collecting the empty cores of the exhausted reels and supplying the full reels and in the processing position of the web reels for unwinding by the manufacturing machine.

The supplying of the full reels and the collecting of the cores of exhausted reels, are done in a vertical movement of lowering and raising respectively, during which the full reels are placed on the chucks and the empty cores are taken off them in a movement coaxial with the axis of the corresponding chuck, the axes of the chucks themselves being orientated, in the end-of-travel position on the rear side of the machine, vertically upwards coaxially with a pincer for gripping the full reels and/or with a pincer for gripping the empty cores which is mounted in such a way that it can be moved vertically on the supply means.

Preferably, in the processing position of unwinding, the reels are arranged with their axes horizontal and transversely relative to the manufacturing machine, that is in the direction in which they are transferred from the rear side to the front side of the machine.

Another feature is that, directly alongside the manufacturing machine is a magazine for at least one vertical stack of full reels coaxial with each other, while the supply means, specifically the gripping pincer of the latter, can be translated along a horizontal path between a position where it collects the full reels, in which it is coaxial with the stack of reels in the magazine, and a position coaxial with the corresponding chuck orientated upwards in the end-of-travel position of the transfer means on the rear side of the machine and vice versa, the full reels also being collected from the stack in the magazine with a vertical movement in both directions of the gripping pincer.

Advantageously, the axis of the chuck orientated vertically upwards in the end-of-travel position of the transfer means on the rear side of the machine and the axis of the stack of reels in the magazine are contained in the same vertical plane parallel with the rear side of the machine and therefore the horizontal translation of the gripping pincer of the supply means also takes place in said plane.

In accordance with an improvement, the magazine is formed by a table whose top can rotate about a vertical axis and on which a plurality of stacks of full reels are arranged, in such a way that a predetermined rotation brings each stack into the coaxial position for collection by the gripping pincer.

The stacks of reels are advantageously held on a transport board known as a pallet, which rests removably on the rotating table top, or constitutes the removable top of said table.

This advantageously enables the pallet on which the web reels are transported from the producer to the user, to be loaded directly onto the magazine table without requiring additional transfer from the pallet to the table.

Another advantageous feature is that the gripping pincer of the supply means simultaneously has jaws for gripping full reels and jaws for gripping the empty cores of the reels, which jaws act in alternation and engage with the outer peripheral sides of the full reels and of the empty cores.

If the manufacturing machine is of the kind that uses different kinds of reel-wound web, it is advantageous to provide a plurality of magazines for the full reels, two being at the two ends and one or more at intermediate points along the rear side of the machine, each of which magazines is provided with transfer means that can be moved from the rear side to the front side of the machine much as described above through associated transverse tunnels or passages; it is also possible to have at least one pincer for gripping full reels and/or empty cores that can be moved all the way along the rear side of the machine and that serves one or more magazines alternately, the axes of the stacks of the various reels and the axes of the chucks being in the vertically upwardly orientated position of the various transfer means aligned with each other in the same vertical plane, preferably parallel with the rear side of the machine, and running parallel with which is the path of translation of the gripping pincer(s) whose axis is also contained in this vertical plane.

The advantages of the invention will be clear from the above account supplying and handling the very heavy web reels is simplified, and at the same time much toil on the part of the operatives is avoided. The supply means are extremely simple and easy to construct. The reels are supplied automatically with very few transfer passages and moreover one device can supply different types of reels to different points of the manufacturing machine. Given a very long reel, furthermore, it is sufficient to provide only one supply means for supplying reels from the magazine to the transfer means, since rest times will be very high.

The invention also encompasses other features which further improve upon the manufacturing machine described above and which are described hereafter.

BRIEF DESCRIPTION OF THE DRAWINGS

The particular features of the invention and the advantages procured thereby will appear in greater detail in the description of certain preferred embodiments, illustrated by way of non-restricting example in the accompanying drawings, in which.

DESCRIPTION OF THE PREFERRED EMBODIMENT

Figure 1:
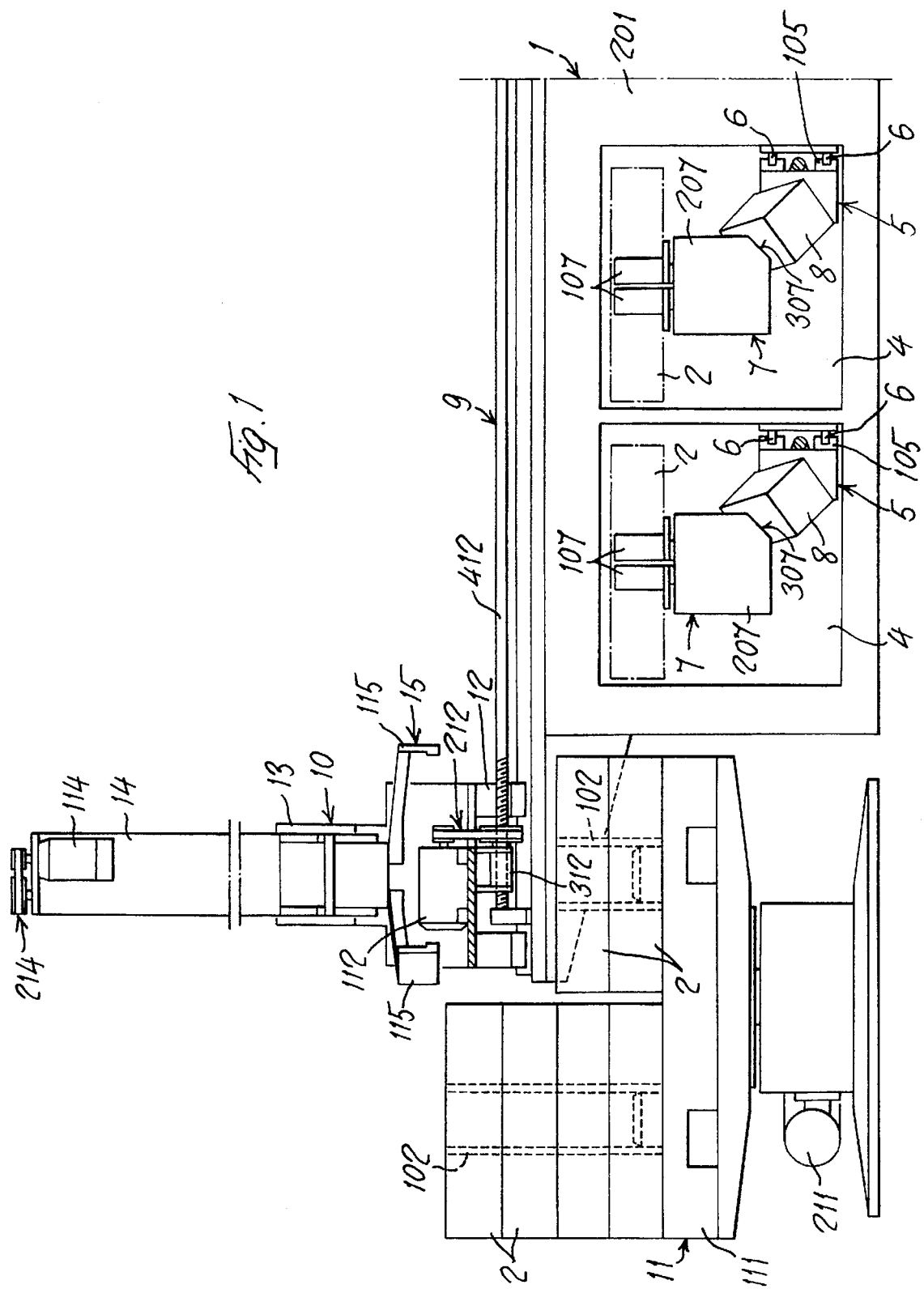
FIG. 1 is a partial view of the rear side of a manufacturing machine according to the invention.
Figure 2:
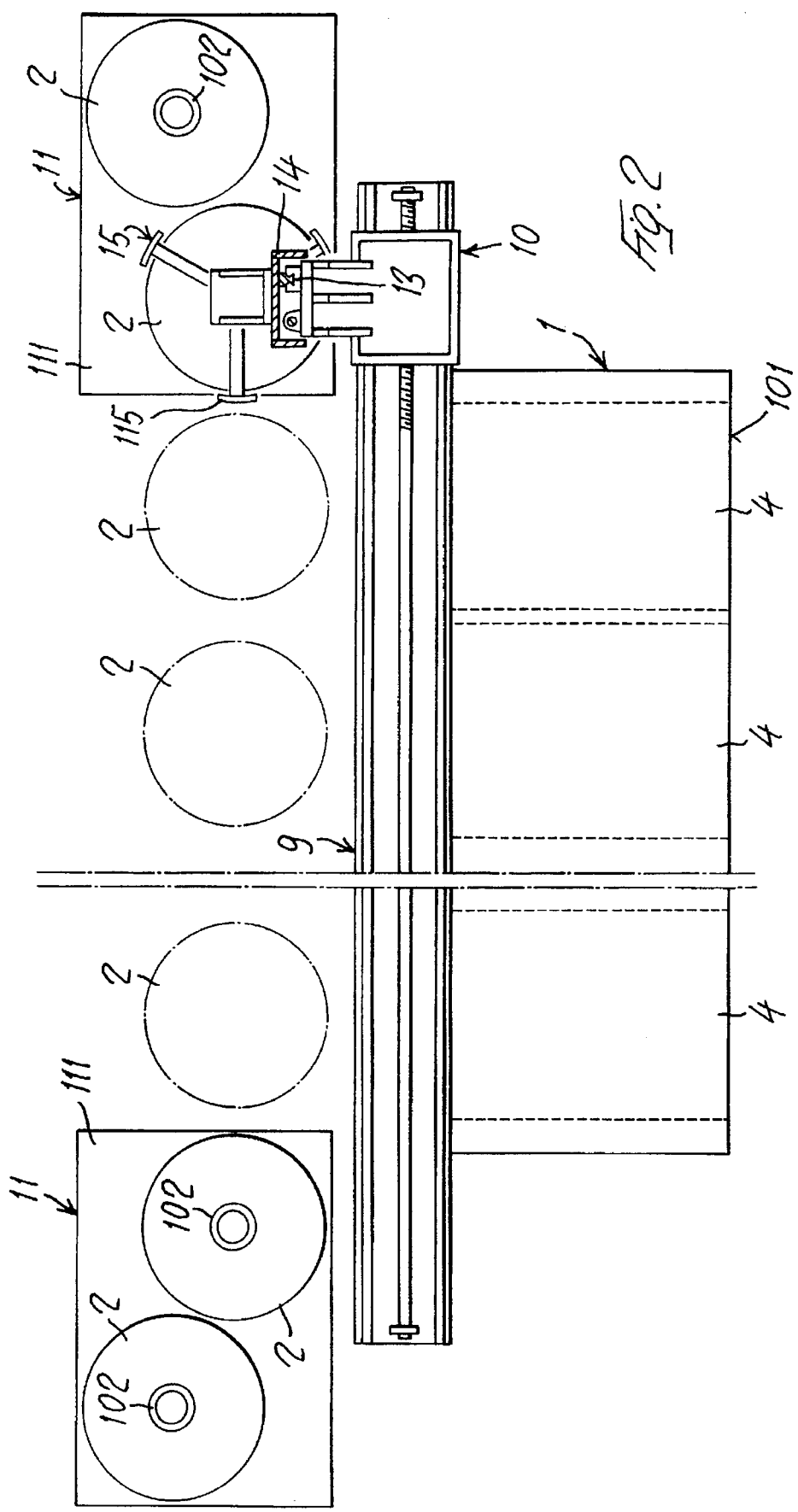
FIG. 2 is a schematic plan view of the manufacturing machine according to the invention.
Figure 3:
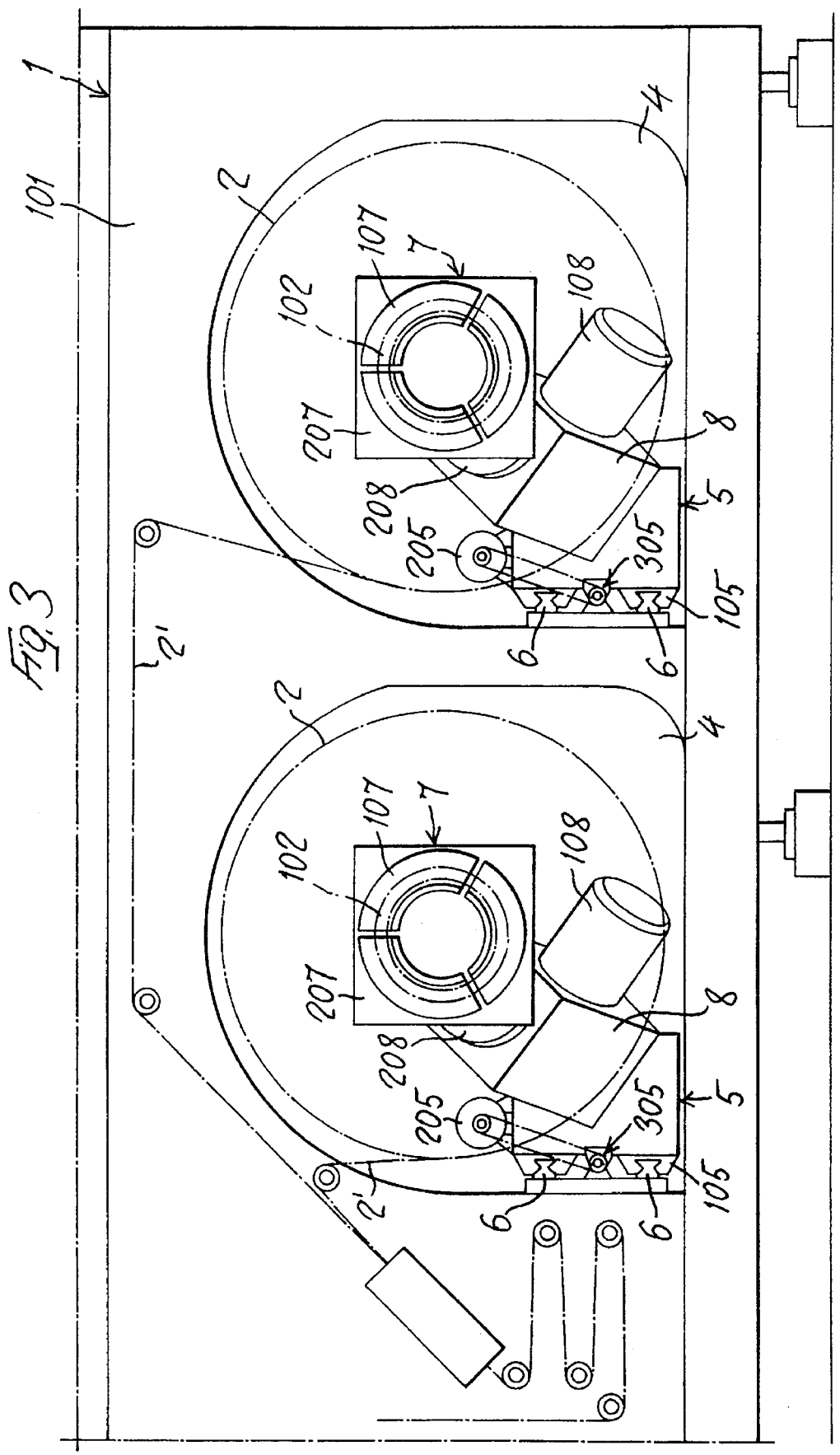
FIG. 3 is an enlarged partial view of the front side of the manufacturing machine shown in the previous figures.
Figure 4:
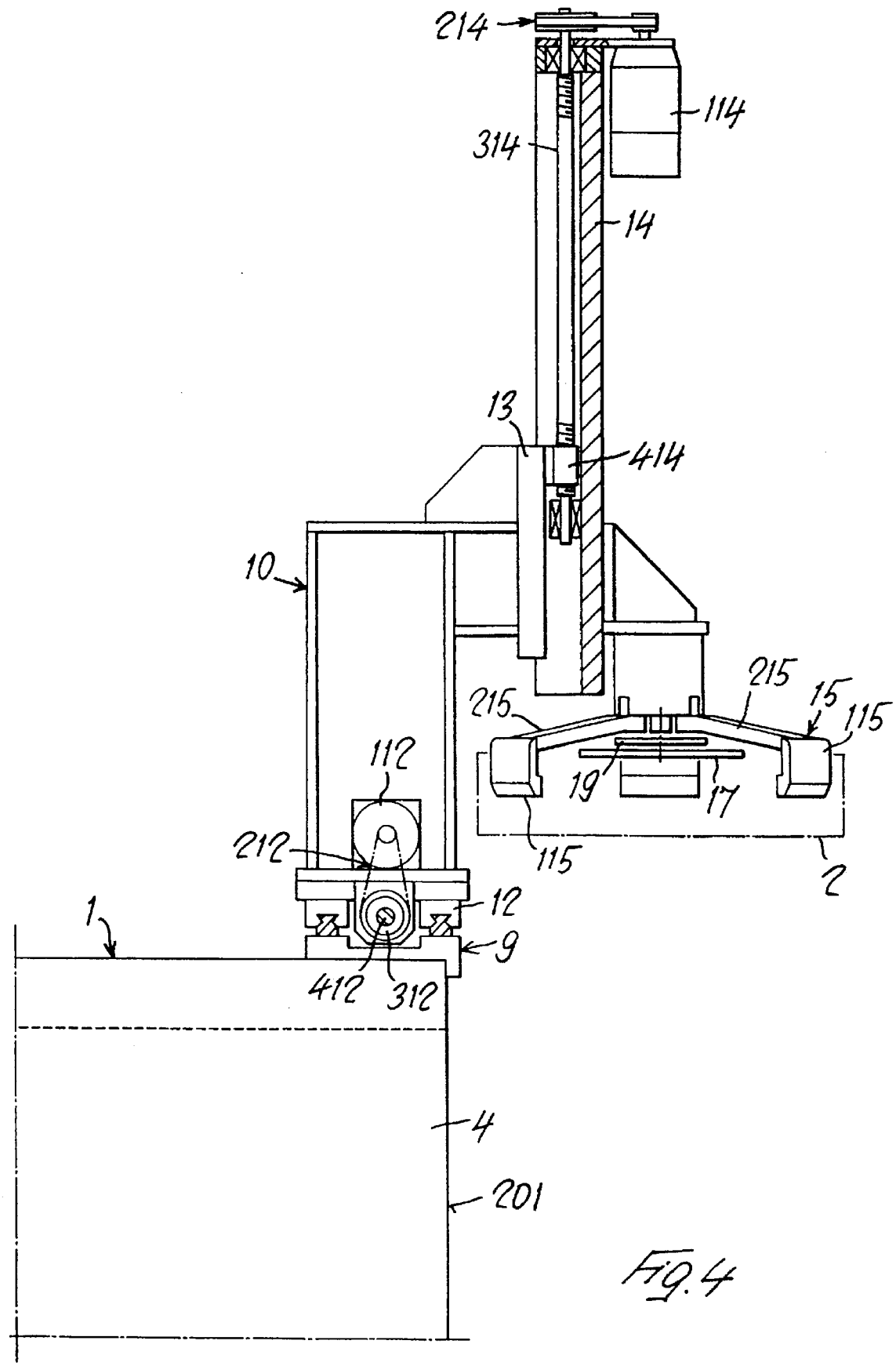
FIG. 4 is a view in the direction of the horizontal translation of the supply means along the rear side of the manufacturing machine.

FIGS. 1 to 4 illustrate a manufacturing machine 1 that uses webs of material 2' wound in reels 2, as for instance a packaging machine for making packets of cigarettes, a cellophane wrapping machine or the like. Of the manufacturing machine 1, only that part of the body which is significant for the invention is illustrated. As indicated in FIG. 3, in the processing position of unwinding, the reels 2 are arranged on the front side of the manufacturing machine 1, their axes being approximately perpendicular to said side. In the lower region of at least one end of the manufacturing machine 1 is at least one tunnel, preferably two adjacent and parallel tunnels or passages 4 orientated parallel with the axis of the reels 2 when the latter are in the processing position of unwinding of the web. The entrance of the tunnels or passages 4 is greater than the diameter of the full reels 2 and they open on the front side 101 and on the rear side 201 of the manufacturing machine. Inside each tunnel or passage 4 are transfer means 5, each for one reel 2. The transfer means 5 are provided with a runner 105 which is mounted on and travels along guide rails 6 orientated parallel with the tunnels or passages 4, and they can be moved from the front side of the machine, in an end-of-travel position in which the reel 2 is in the processing position of unwinding (FIG. 3), to the rear side of the machine (FIG. 2), or rather beyond said rear side 201, to a position in which they project beyond the rear entrance of the tunnel or passage 4 by more than the diameter of the full reels 2, and vice versa. The runner 105 is moved by means of a motor 205 mounted on the runner itself and operating a screw-and-nut drive indicated as a whole by the numeral 305. The transfer means 5 each directly carry a chuck 7 for the unwinding of the reels 2. The chucks 7 are of the expanding-jaw type 107, which is basically familiar, and grip the core 102 of the reel 2 from the inside. Both the drive motor of the chuck 7 and the actuators controlling the jaws 107 are also carried on the transfer means 5, whereas the activation thereof is controlled by the manufacturing machine, which synchronizes them with its own processing units, via flexible control lines and/or ducts of a commonly known type. The chucks 7 are mounted on the runners 105 of the transfer means 5 in such a way that they can be pivoted back and forth between a position in which their axis is orientated parallel with the direction of transfer, that is coaxially with the axis of the reel 2 in the processing position of unwinding, and a position in which their axis is orientated vertically upwards. The first orientation is adopted at the end of travel of the transfer means 5 on the front side 101 of the manufacturing machine 1 (FIG. 3), while the second or vertical position of the axis is adopted in the end-of-travel position of the transfer means 5 on the rear side 201 of the manufacturing machine 1 (FIGS. 1 and 2).

Advantageously, the pivoting of the chucks 7 on the transfer means 5 is achieved by manipulating means 8 consisting of a driven shaft, having a flange 208 to which is connected the casing 207 of the corresponding chuck 7 which constitutes a sort of tool holder, containing the means for actuating the jaws 107 and for rotating the chuck. The shaft of the manipulator 8 is the output shaft of a speed-reducing unit whose casing also carries the drive motor 108 which is therefore also movable with the transfer means 5.

If we define as a three-dimensional system of mutually perpendicular Cartesian axes, the direction of transfer, that is the axis of the tunnels or passages 4, a vertical axis and a horizontal axis perpendicular to the first two and optionally parallel or approximately parallel with the front side 101 and/or rear side 201 of the manufacturing machine 1, in other words along which axis runs the longitudinal line of the manufacturing machine 1, then the axis of rotation of the casing 207 of the chuck 7 is inclined-with respect to all three above-mentioned axes which define the three-dimensional Cartesian system. Advantageously the axis of rotation of the chuck casing 207 is orientated along the diagonal between two corners diametrically opposite each other of an imaginary cube whose edges are parallel with said three-dimensional system of Cartesian axes, in other words whose edges are parallel with a vertical axis, with the axis of the tunnels or passages 4 and with a horizontal axis perpendicular to the first two. The axis of the chuck 7 is perpendicular to one of the faces of the imaginary cube. This geometrical condition is shown in FIGS. 1 and 3 by the fact that the casing 207 of the chuck 7 and the casing of the speed-reducing unit indicated at 8 are cubical. The output shaft of the speed-reducing unit 8 is perpendicular to one of the faces of its cubical casing, while the axis of said output shaft is inclined at an angle such that its projection passes through two diametrically opposite corners of the cubical casing 207 of the chuck 7, this casing being orientated such that its edges are always parallel with the axis of the tunnels or passages 4, with a vertical axis and with a horizontal axis perpendicular to the first two, that is to say approximately parallel with the front and/or rear side of the machine. The cubical casing of the speed-reducing unit 8 is however inclined with respect to said three axes in the same way as the inclination of the axis of the output shaft of the speed-reducing unit 8 and the flange 208 of the output shaft of the speed-reducing unit 8 is fixed to a flat 307 on the adjacent corner of the cubical casing 207 of the chuck 7, whose surface is perpendicular to the diagonal between this corner and the corner diametrically opposite it.

In this way, with a single simple rotation, it is possible to orientate the axis of the chuck 7 coaxially with the reel 2, in its processing position of unwinding of the web 2' on the front side 101 of the manufacturing machine, and vertically and coaxially with the direction in which the full reel 2 is supplied, on the rear side 201 of the machine 1; and moreover only a very small amount of space is required for said pivoting movement.

Along the rear side 201 of the manufacturing machine 1 is a horizontal guide rail 9 perpendicular to the vertical axis and to the axes of the tunnels or passages 4, for means 10 for supplying full reels 2 from a magazine 11 of stacks of full reels 2 to the transfer means 5 in the end-of-travel position on the rear side of the manufacturing machine 1. The magazine 11 holds at least one vertical pile of full reels 2 which are orientated coaxially with each other and their vertical axis is contained in the same vertical plane, preferably parallel with the horizontal guide rail 9, as the axes of the chucks 7 in the rear end-of-travel position of the transfer means 5. This vertical plane is advantageously to the rear of the horizontal guide rail 9, while carried on the guide rail 9 by means of a carriage 12 is another, vertical guide rail 13 in which a supporting upright 14 is mounted in such a way as to be able to travel vertically. At its bottom end, the supporting upright 14 carries, projecting from its rear side, a pincer 15 for gripping full reels 2, the central axis of which is also contained in the vertical plane containing the axes of the stack of full reels 2 on the magazine 11 and the vertically upwardly orientated axes of the chucks 7 in the rear end-of-travel position. As a result, the gripping pincer 15 can be moved between a position for collecting full reels 2 from the stack on the magazine 11, in which it is coaxial with these reels, and a position for removing the reel collected from the corresponding chuck 7 in the rear end-of-travel position, in which it is coaxial therewith by means of a simple, straight, horizontal translation.

The horizontally translating carriage 12 carries a drive motor 112 from which, via a drive line 212, the power is taken for a drive consisting of a threaded rod 412 and nut 312. Vertical movement of the gripping pincer 15 is also controlled by a motor 114 which is mounted at the top of the travelling upright 14 and which turns, by means of a belt drive 214, a screw 314 which is supported rotatably inside the tubular upright 14 and which runs parallel with said upright 14. The screw 314 is engaged in a threaded bush 414 integral with the guide 13 and nonrotatable.

Advantageously, where the reels 2 are provided with cores 102, before a full reel 2 can be unloaded onto one of the chucks 7, it is necessary to collect and expel the empty core 102. For this purpose, therefore, a pincer is provided for gripping the cores 102, and this gripper, in the embodiment illustrated, is advantageously incorporated in the pincer 15 for gripping the full reels 2.

Figure 5:
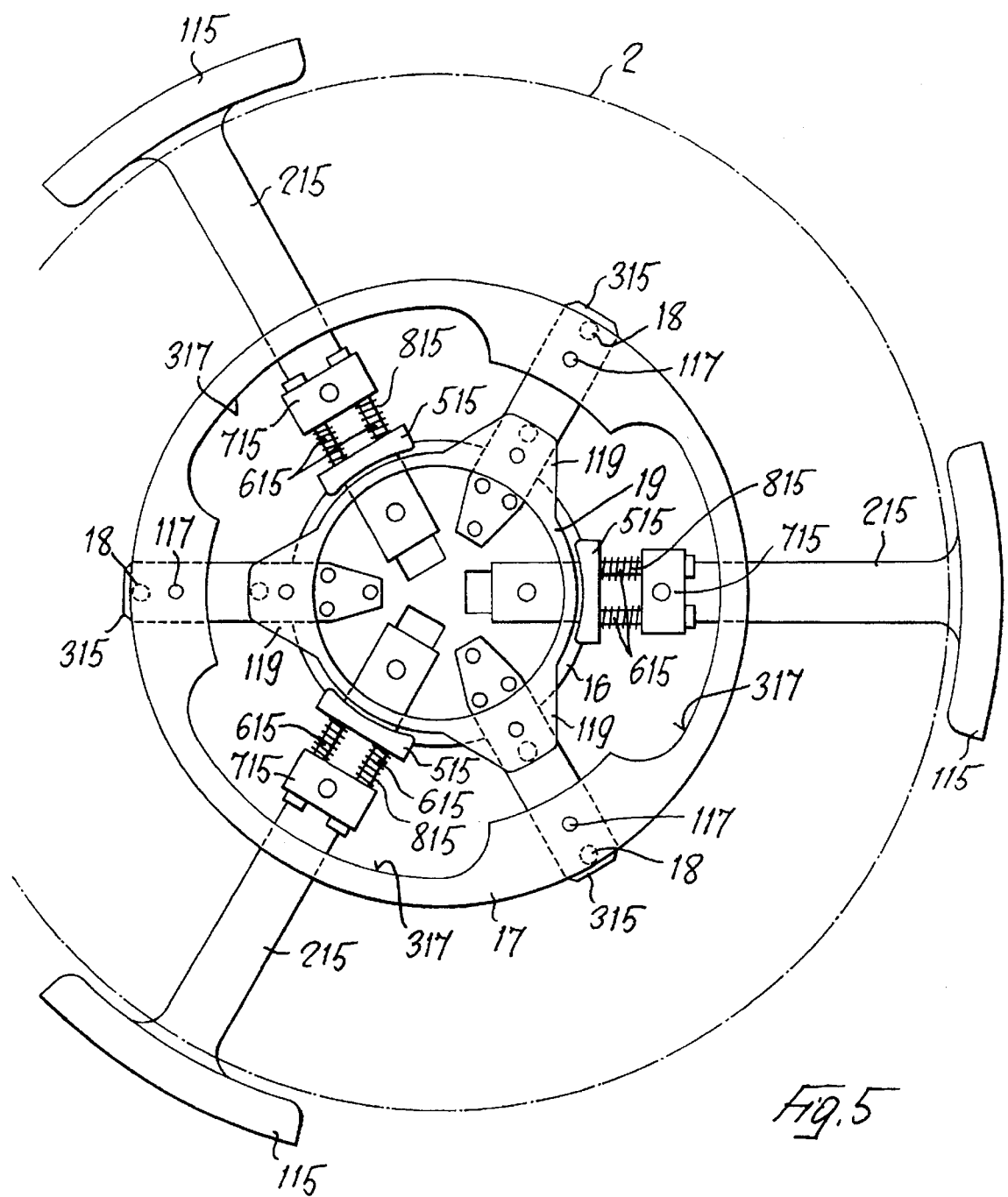
FIG. 5 is a view in the direction of the axis of the gripping jaw of the means that supply the full reels and collect the empty cores.
Figure 6:
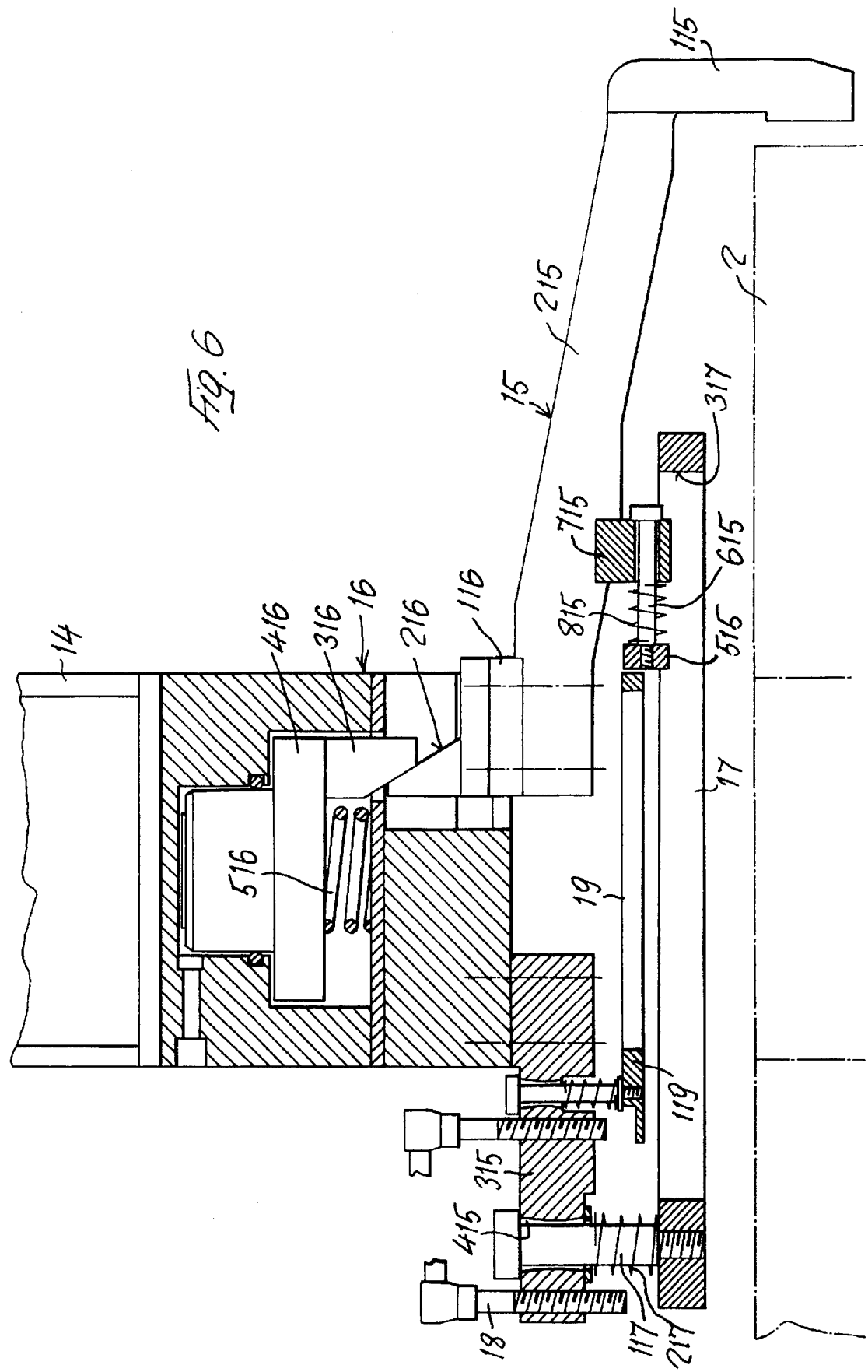
FIG. 6 is an enlarged partial axial section through the gripping pincer shown in FIG. 5.

With reference to FIGS. 5 and 6, the gripping pincer 15 comprises a plurality of jaws 115 for gripping full reels 2 around their outer peripheral side, to avoid interference with the chucks 7 on the transfer means 5 which grip the core 102 of the reel 2 from the inside of the core. In the embodiment illustrated there are three reel-gripping jaws. 115, appropriately curved to correspond to the outer peripheral side of the full reels 2 and radially morale away from and towards the axis of the gripping pincer 15. The reel-gripping jaws 115 project downwards on the ends of radial jaw-carrying arms 215 which are attached at their inner radial ends to the radial cursors 116 of an actuating unit 16. This actuating unit 16 is of a type known per se and basically identical to the radial means of actuation of the jaws 107 of the chucks 7, for instance the kind sold by Rhöm company under the name Typ 538. The cursors 116 have inclined surfaces 216 that engage with a mating conical axial pusher 316, which is moved in one direction by a hydraulic or pneumatic piston 416 and in the other by a counteracting spring 516.

Fixed to the actuating unit 16, or more specifically to the stationary part of its body, between the jaw-carrying arms 215, are arms 315 below which there projects, attached by one end, underneath the jaw-carrying arms 215, a coaxial end-of-travel sensor ring 17. The sensor ring 17 is mounted with axial elasticity by means of guide pins 117 with enlarged heads passing slidably through coinciding holes 415 in the sensor-carrying arms 315, with springs 217 being fitted between the opposing faces of the sensor ring 17 and of the stationary sensor-carrying arms 315. The diameter of the sensor ring 17 is equal to the intermediate diameter of a full reel 2. On the face nearest the sensor-carrying arms 315, the sensor ring 17 engages with sensors, for example proximity sensors or the like 18, that are carried by the sensor-carrying arms 315 and control the starting and stopping of the motor 114. The jaw-carrying arms 215 carry, at an intermediate point selected to correspond to their radial travel and to the diameter of the cores 102 of the reels 2, jaws 515 for gripping these cores 102. The jaw-carrying arms 215 are inclined downwards towards their outer radial ends, and therefore the core-gripping jaws 515 are situated at a higher level than the reel-gripping jaws 115 and higher than the sensor ring 17 for sensing the presence of full reels.

The sensor-carrying arms 315 support another sensor ring 19 which detects the presence of a core 102. The sensor ring 19 fits radially inside the core-gripping jaws 515 and its internal and external diameters are approximately equal to these. The ring 19 for sensing the presence of the cores 102 is attached to the sensor-carrying arms 315 by means of outer radial extensions 119. The ring 19 for sensing the presence of the cores is situated level with the topmost part of the core-gripping jaws 515 and is supported in a similar way to the ring 17 for sensing the presence of the full reels 2. This arrangement is due to the particular geometrical and dimensional characteristics of the reels 2 and cores 102, and when full reels 2 are being gripped, the ring 19 for sensing the presence of the cores 102 interferes with the core-gripping jaws 515, since it is not pushed axially upwards by the core 102, as does occur when a core 102 is being gripped. Consequently the core-gripping jaws 515 are supported in such a way as to yield elastically and radially outwards by an amount equal to the gripping movement of the reel-gripping jaws 115. The jaws 515 for gripping the cores 102 are mounted on two radial guide pins 615 having enlarged heads that are guided inside radial holes passing .through a guide block 715 mounted on the jaw-carrying arms 215 on the radially outer end of the jaws 515, with springs 815 being positioned between the guide block 715 and the respective core-gripping jaw 515—preferably two helical springs placed around the pins 615.

In addition, the core-gripping jaws 515 are located in concavities 317 formed in the inside of the ring 17 for sensing the presence of full reels 2.

By means of this construction, it is possible with a single actuating unit to control both the reel-gripping jaws 115 and the core-gripping jaws 515, which are mounted on the same arms 215. The sensors 17, 19 control the lowering of the pincer 15. If a full reel 2 is present, the sensor ring 17 engages with it before the sensor ring 19 does so, arresting the lowering movement at a level such that the full reel 2 is engaged only by the reel-gripping jaws 115, which reach further down than the core-gripping jaws 515. If empty cores 102 are present, then since the sensor ring 17 has an internal diameter greater than the external diameter of the cores 102, the pincer 15 continues to move down until the core is met by the sensor ring 19, which then stops the pincer 15 in a position of interference by the core-gripping jaws 515 with the core 102, while sensor ring 19 is moved simultaneously to a position of noninterference by said core-gripping jaws 515.

Obviously, a station is provided for removing the cores 102 collected from the pincer 15, and to which the guide rail 9 leads.

Another feature shown schematically in FIG. 2 and which is advantageous in manufacturing machines that use different kinds of web material, for instance packaging machines for enclosing cigarettes or the like in packets or cellophane, the processing units which use the web material, and more particularly the unwinding stations of these, are located underneath the horizontal translation guide rail 9 for the means that supply the full reels and expel the empty cores 102, and said stations are distributed side by side along the dimension of the manufacturing machine in the direction of translation of the supply means, there being one tunnel or passage 4 with associated transfer means 5 at each web-material unwinding station. Alternatively, if a suitable vertical movement is allowed for the pincer 15, it is possible to have unwinding stations with associated tunnels or passages 4 and corresponding transfer means even in parts of the manufacturing machine 1 situated above the translation guide rail 9. Each tunnel or passage 4 for transferring reels of different web material may have its own magazine 11. FIG. 2 illustrates a particular case in which the unwinding stations are situated at the two opposite ends of the manufacturing machine 1 and each of them is provided with its own magazine 11. When replacement of the web material has to be done very fast, it is advantageous to have two tunnels or passages 4 with two transfer means 5 for the same type of reels of web material and that . serve two alternative unwinding stations which can have automatic devices for joining the web of a full reel to the tail end of the web of the adjacent exhausted reel (see right-hand side of FIG. 2). Where there are no problems with unused time, a single unwinding station served by transfer means 5 for a single reel is sufficient (see left-hand side of FIG. 2).

One or more pincers 15 can be mounted on the guide rail 9 with independent carriages 12 for horizontal movement and 13 for vertical movement, each of which serves one or more transfer means 5 linked to one or more magazines 11 which are located, for instance, along segments of the translation guide rail 9. Nevertheless, where the times to exhaust the reels are great, it is sufficient to use a single pincer 15 serving all the transfer means 5 and the associated magazines 11.

In the example illustrated, the magazines 11 consist of tables having tops 111 that rotate about a vertical axis. They carry a plurality of stacks of full reels 2, each stack being moved into the position for collection, which coincides coaxially with the pincer 15, by a predetermined rotation of the table top 111. This is produced by a motor 211 acting through a drive (not illustrated) and is synchronized with the supply means, namely the pincer 15.

Advantageously, the rotatable top 111 of the turntable magazine is able to hold, or consists of, a pallet, which greatly facilitates the operations of loading the magazines 11. In particular, the pallet has dimensions different from those of European standards and is approximately one third smaller, i.e. 1200 mm long by 800 mm wide. In this way each pallet can hold two 600 mm diameter reels, such as those usually used in cigarette packaging machines and the like, arranged roughly diagonally. The smaller widths of the pallets, as compared with European standard pallets which can carry four reels of the abovementioned diameter, mean that it is possible to increase the load of the means of transport. This is because with the present-day standard vehicle dimensions, only two European standard pallets can be placed side by side, for a total of only eight stacks of reels, leaving a considerable amount of unused loading space which with the smaller pallets as described above can be used, so that 10 stacks of reels can be loaded next to each other.

Naturally, the invention is not limited to the embodiments described above and illustrated but can be greatly altered and modified, especially from the constructional point of view, without departing from the underlying principle set forth above and claimed below.

We claim:

1. A manufacturing machine which uses a core loaded with a reel of web material wound thereabout and which has a front side and a rear side, comprising:

a processing unit in which the web material is consumed, a portion of said processing unit being located at the front side;

a passage having a longitudinal axis which extends from the front side to the rear side;

a transfer means for transferring through said passage a loaded core from the rear side to the front side at which front side the web material is consumed by said processing unit leaving an empty core, and for transferring the empty core back through said passage from the front side to the rear side after the web material has been processed by said processing unit, said transfer means including
      an unwinding chuck having a chuck axis about which the loaded core is gripped and mounted for unwinding of the web material,
      a chuck mounting means for mounting said chuck for movement of the chuck axis between a vertical orientation at the rear side and a horizontal orientation at the front side;

a supply means for supplying the loaded core to said transfer means and for removing the empty core from said transfer means when said transfer means is at the rear side, said supply means including
      a gripping means for gripping the loaded core and for gripping of the empty core, and
      a moving means for moving said gripping means vertically between a raised position above said chuck and a lowered position adjacent said chuck whereby a loaded core held by said gripping means is vertically loaded on said chuck and subsequently an empty core is vertically removed from said chuck.

2. A manufacturing machine as claimed in claim 1 wherein said chuck mounting means (a) moves the chuck axis to a horizontal position parallel to said longitudinal axis when said chuck is at the rear side and hence prior to transfer of said chuck through said passage with the loaded core and (b) moves the chuck axis back to vertical after said chuck is moved to the rear side with the empty core.

3. A manufacturing machine as claimed in claim 2
wherein said transfer means further includes a straight guide rail having a rail axis which is parallel to the longitudinal axis of said passage; and wherein said chuck mounting means includes a rotation means for rotating said chuck such that the chuck axis angularly rotates about an axis which is inclined with respect to the rail axis, with respect to a vertical axis, and with respect to an axis perpendicular to the rail axis and the vertical axis.

4. A manufacturing machine as claimed in claim 1 wherein said gripping means includes a pincer device having (a) at least two reel gripping jaws which are movable radially toward and away from a central axis of said pincer device to grip and release an outer peripheral side of the loaded core, and (b) at least two core gripping jaws which are movable radially toward and away from the central axis of said pincer device to grip and release an outer peripheral side of the empty core.

5. A manufacturing machine as claimed in claim 4
wherein said pincer device includes at least two arms, each said arm having a respective said reel gripping jaw and a respective core gripping jaw attached thereto;

wherein each said reel gripping jaw has an axial surface which is a circular segment with a radius of curvature approximately equal to that of the reel;

wherein each said core gripping jaw has an axial surface which is a circular segment with a radius of curvature approximately equal to that of the core; and further including an automatic selector means for selectively activating said reel gripping jaws when a loaded core is present in said pincer device and for selectively activating said core gripping jaws when an empty core is present in said pincer device.

6. A manufacturing machine as claimed in claim 5
wherein each respective said reel gripping jaw is located on an end of the respective said arm at a position vertically below a location of the respective said core gripping jaw; and wherein said automatic selector means includes
a first end-of-travel sensor which senses a lowering of said pincer device onto a loaded core such that lowering of said pincer device is terminated at a first location where said reel gripping jaws are in position to engage the loaded core and said core gripping jaws are above a position of engagement with the loaded core, and a second end-of-travel sensor which senses a lowering of said pincer device past a position where said first sensor senses a loaded core and hence onto an empty core such that lowering of said pincer device is terminated downwardly past the first location and at a second location where said core gripping jaws are in a position of engagement with the empty core.

7. A manufacturing machine as claimed in claim 6
wherein said pincer device further includes a jaw-carrying head in which are mounted respective radial cursors located at equal angular intervals about the central axis of said pincer device, each said cursor having a respective said arm attached thereto;

wherein each said arm is mounted with a downward inclination from the respective said cursor to a free end at which the respective said reel gripping jaw is located; and wherein each said core gripping jaw is mounted from an underside of the respective said arm at an intermediate position position between the respective said cursor and reel gripping jaw and at a higher position than the respective said reel gripping jaw.

8. A manufacturing machine as claimed in claim 1 and further including
a magazine having a vertical magazine axis along which a vertical stack of loaded cores are provided coaxial with each other and the vertical magazine axis;

a path means on which said supply means moves in a horizontal path between (a) a collection position where said supply means is located over said magazine for collection of a loaded core from said magazine by a vertical movement of said gripping means by said moving means and (b) a loading position above said chuck when said chuck is at the rear side.

9. A manufacturing machine as claimed in claim 8
further including a removal station where empty cores are deposited by said supply means after being removed from said chuck; and wherein said horizontal path of said path means extends to said removal station.

10. A manufacturing machine as claimed in claim 9 wherein the vertical magazine axis and the vertical orientation of the chuck axis form a vertical plane parallel to the horizontal path, and wherein said supply means moves the loaded core from said magazine to said chuck along the vertical plane.

11. A manufacturing machine as claimed in claim 10
wherein said path means includes a horizontal guide rail parallel to the vertical plane and extending along the rear side;

wherein said supply means includes a carriage which moves along said horizontal guide rail; and wherein said moving means of said supply means includes a vertical guide rail mounted to said carriage and a vertical travelling column which moves vertically on said vertical guide rail and to which said gripping means is attached so as to project horizontally beyond the rear side.

12. A manufacturing machine as claimed in claim 10 wherein said magazine includes a table top which is rotatable about a vertical axis and on which a plurality of stacks of loaded cores are provided such that each stack is movable by a rotation of said table top to a position where each said stack is coaxial with the magazine axis.

13. A manufacturing machine as claimed in claim 1
wherein said processing unit consumes a second web material;
further including
a second passage similar to, adjacent to, and parallel to said first-mentioned passage, and
a second transfer means for said second passage similar to said first-mentioned transfer means; and wherein said supply means additionally supplies a loaded core with the second web material to said second transfer means and removes the empty core from said second transfer means.

14. A manufacturing machine as claimed in claim 13 and further including
first and second magazines having respective first and second vertical magazine axes along which a respective vertical stack of first and second loaded cores are provided which loaded cores of a stack are coaxial with each other and the associated vertical magazine axis; and a path means on which said supply means moves in a horizontal path between (a) first and second collection positions where said supply means is located over the respective said first or second magazine for collection of a loaded core from the associated said magazine by a vertical movement of said gripping means by said moving means and (b) a loading position above a first or second chuck when said chucks are at the rear side.

15. A manufacturing machine as claimed in claim 1 wherein said processing unit includes a plurality of stations each of which consumes a respective web material;

wherein each said station has associated therewith at least one of said passages and an associated said transfer means with an associated said chuck and chuck axis, with all of said chuck axes when in the vertical orientation at the rear side being in a single vertical plane; and wherein said supply means includes a translation guide rail along which said gripping means moves to supply loaded cores and remove empty cores from each said transfer means associated with a respective said station, said translation guide rail being parallel to the vertical plane.

16. A manufacturing machine as claimed in claim 15 and further including a magazine adjacent said translation guide rail from which said transfer means picks up a loaded core, said magazine including a table top which is rotatable about a vertical axis and on which a plurality of stacks of loaded cores are provided such that each stack is movable by a rotation of said table top to a position where a topmost loaded core of the stack is picked up by said gripping means.

17. A manufacturing machine as claimed in claim 16 wherein said table top is one of a pallet or pallet support.

18. A manufacturing machine as claimed in claim 1 wherein said processing unit consumes the web material as cigarettes are packaged.

* * * * *